No. 636,138. Patented Oct. 31, 1899.
J. HATFIELD.
DRIVING ATTACHMENT FOR WIRE CABLES.
(Application filed Jan. 17, 1898.)
(No Model.)
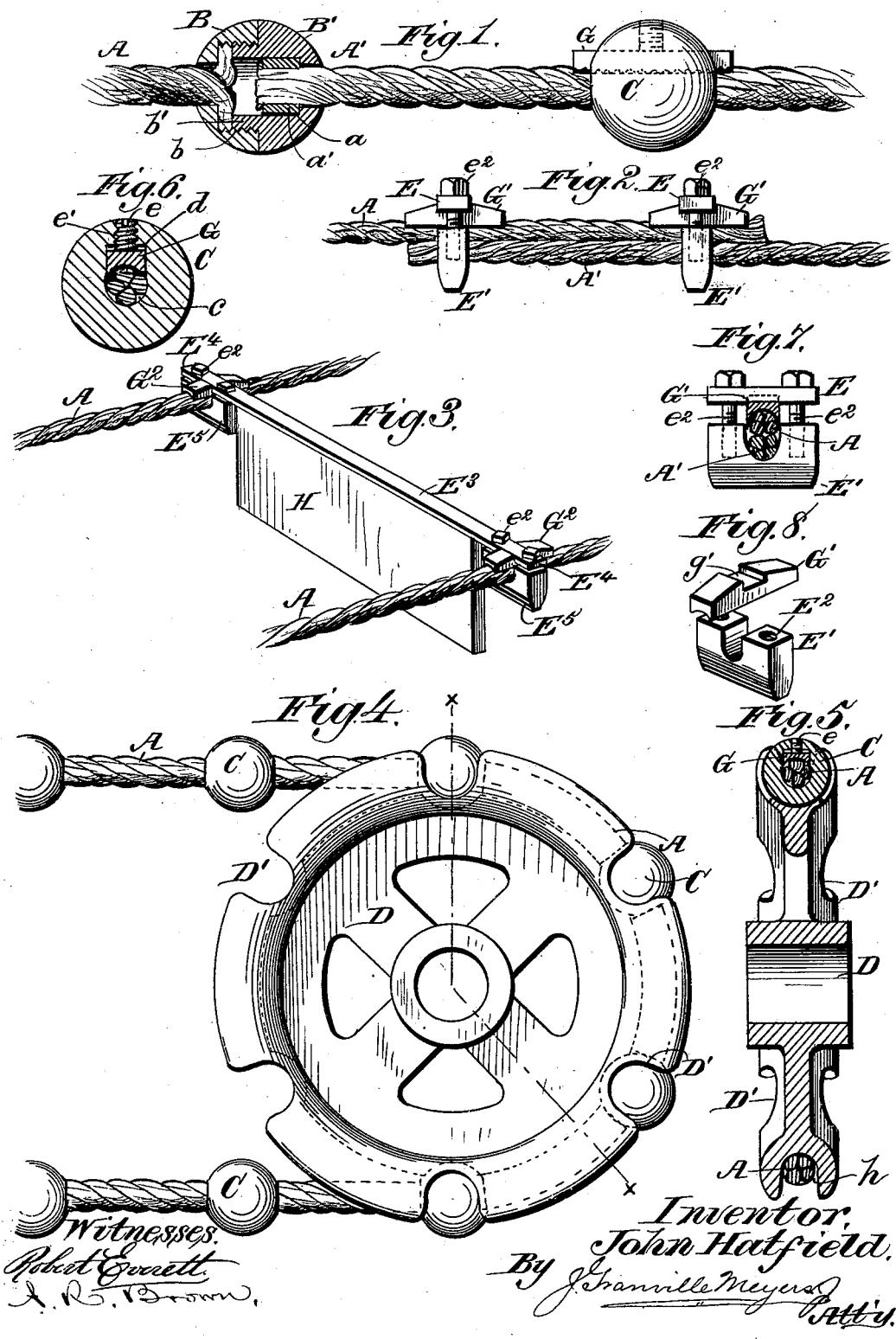
Witnesses.
Robert Everett
A. R. Brown
Inventor,
John Hatfield,
By J. Granville Meyers
Att'y.

United States Patent Office.

JOHN HATFIELD, OF NEW YORK, N. Y.

DRIVING ATTACHMENT FOR WIRE CABLES.

SPECIFICATION forming part of Letters Patent No. 636,138, dated October 31, 1899.

Application filed January 17, 1898. Serial No. 666,994. (No model.)

*To all whom it may concern:*

Be it known that I, JOHN HATFIELD, a citizen of the United States, residing at New York, borough of Brooklyn, in the county of Kings and State of New York, have invented new and useful Improvements in Driving Attachments for Cables for the Transmission of Power, of which the following is a specification.

My invention relates to improved driving attachments for cables.

The principal object of my invention is to provide improved means for detachably securing to a cable, at equal intervals thereon, devices for engaging suitable recesses formed in the periphery of a wheel, whereby to adapt said parts to operate in the manner of a sprocket wheel and chain.

A further object of the invention relates to the construction of one or more of said devices whereby to enable it or them to be employed in securing together the meeting ends of the cables to form a continuous sprocket-chain.

A further object of the invention relates, broadly, to means for attaching to a cable parts that are designed to travel therewith.

Having thus stated the general objects of my invention, I will now proceed to describe the same in detail, reference being had to the accompanying drawings, in which—

Figure 1 is a view, partly in section, of a portion of a drive-cable provided with my improved devices and coupling. Fig. 2 is a view of a modified form of the invention, showing the same employed to connect the ends of a cable in a different manner from that illustrated in Fig. 1. Fig. 3 is a perspective of a portion of an endless conveyer of an elevator, showing a carrier secured to the cables according to my invention. Fig. 4 is a front elevation of a sprocket wheel and chain or cable constructed according to my invention. Fig. 5 is a section thereof on the line $x\ x$ of Fig. 4. Fig. 6 is a cross-section through one of the spherical engaging devices and cable, taken at a right angle to the cable. Fig. 7 is a cross-section of one of the engaging devices, and Fig. 8 is a detail perspective view of one of the clamps and engaging devices shown in Fig. 2.

The reference-letters A and A' indicate the two ends of an ordinary wire cable, which are designed to be secured together to form an endless drive chain or cable.

The letters C indicate the spherical engaging devices, which are secured on the cable in the following manner: Extending through these engaging devices or balls C is a circular passage $c$, designed to receive the cable, and a rectangular or squared passage $d$, communicating or forming a continuation of the circular passage $c$, provides a keyway for a clamp G, which has its under side concaved and preferably roughened to engage the cable. The circular passage $c$ and rectangular passage $d$ when taken together form a U-shaped recess, as they are both of substantially the same diameter. The letter $e'$ indicates a screw-threaded aperture which extends from the periphery of the ball to said passage $d$ and in a direction at right angles thereto, whereby a screw $e$ may be inserted therein and brought to bear upon the upper surface of the clamp G to hold the same and the ball C firmly in engagement with the cable, the outer end of the screw lying flush or perhaps slightly beneath the periphery of the ball.

The clamp G is of a diameter equal to that of the cable, and therefore it acts upon the latter throughout its greatest diameter, whereby a firm clamping action is effected and slipping or twisting thereof prevented.

In using the engaging devices just described the ends of the cable are connected in the following manner: One of said balls is formed in two hemispherical parts B B', which are apertured to receive the ends of the cable, the end A being soldered or otherwise firmly secured in a recessed portion of the part B, as shown, the end A' being provided with a fixed collar $a'$, which seats in a recess $a$, formed in the part B', said part B' being thereby swiveled on the end A'. The part B is further provided with interior threads $b$, which are adapted to receive the screw-threads of a nipple $b'$ of part B', whereby said parts may be screwed together to form a ball similar to the balls C.

In Fig. 2 I have shown a modified embodiment of the invention, the clamping means for securing the engaging device to the cable being also adapted to assist in securing the ends of the cable together. In this figure the letters E' indicate the engaging devices, each of which is in the form of a yoke having a U-shaped recess therethrough, the walls of which partly surround the end A' of the cable and project below the same to form engaging devices, as shown, corresponding in this particular to the balls C first described. The ends of these yokes are provided with screw-threaded apertures E², as shown. The end A of the cable is laid on the end A' and secured thereto by means of a clamp G', concaved and preferably roughened on its under surface to engage the cable. Said clamp G' is provided with a recess g', which is adapted to receive a clamp-plate E, having apertures in its ends, through which pass bolts e², having screw-threaded ends engaging in the apertures of said yoke. By turning these bolts the clamp G' may be brought into firm engagement with the end A of the cable and the yoke with the end A', as will be understood. The clamp G', like the clamp G, is of a diameter equal to that of the cable, for the purpose heretofore set forth. I have shown two of these clamping devices employed to unite the ends of the cable; but obviously this number may be varied. It will be understood, of course, that the requisite additional number of these combined clamps and engaging devices may be secured to the single cable-strand to form the drive-cable in a similar manner to that just described, except that the clamp and yoke will engage opposite sides of the same cable.

In Fig. 3 I have shown the form of the invention just described employed to attach carriers to the cables of an endless conveyer. In this figure, H indicates one of the carriers, having on its upper side an integral ledge E³, which is extended beyond opposite ends of the carrier H to form the end extensions E⁴, which extensions are suitably apertured to receive bolts e². The reference-letters E⁵ indicate engaging devices which are similar to the devices E' of Fig. 2 and which are provided with screw-threaded apertures to receive the threaded ends of the bolts e². The clamps G² are similar to the clamps G' of Fig. 2 and are interposed between the extensions E⁴ and the cable. By turning the bolts e² sufficiently far into the apertures of the engaging devices E⁵ said engaging devices and clamps may be caused to grip the cable firmly, and thus secure the carrier H in the proper position thereon. It will be readily seen that the extensions E⁴ have the same function as the clamp-plates E of Fig. 2.

In Fig. 4 an endless cable provided with spherical engaging devices is shown in operative relation with a sprocket-wheel D. Said sprocket-wheel is provided around its periphery with a groove or concave h, in which the cable works, and is further provided at suitable equal intervals with recesses D', in which engage the balls C.

It will thus be seen that drive-cables according to my invention can be readily and economically manufactured and that when an engaging device becomes worn or if it should be broken or injured it may be replaced with a new one.

Having thus described my invention, what I claim as new is—

1. A driving attachment for cables comprising an engaging device having a substantially U-shaped recess extending longitudinally therethrough, a cable seated upon the lower curved wall forming the bottom of said recess, a longitudinal clamp of the same diameter as the cable, arranged in the said recess above the cable and having a direct bearing thereon throughout the entire diameter of the cable, and means acting upon the clamp for forcing the cable into direct clamping contact with the lower curved wall of the said U-shaped recess to lock the engaging device to the cable.

2. A driving attachment for cables, comprising a yoke-shaped engaging device having a U-shaped recess extending longitudinally therethrough, a cable passed through said recess and seated upon the lower curved wall forming the bottom thereof, a longitudinal clamp having a cross-sectional diameter equal to that of the cable, arranged in the recess above the cable and having a direct bearing thereon throughout the entire width of the cable, and means acting upon the clamp to force the cable into clamping engagement with the bottom wall of the recess to lock the said engaging device to the cable.

3. A drive-cable having a series of spherical engaging devices or balls secured thereon one of said engaging devices or balls being formed in two hemispherical parts provided with alining apertures, one of said parts B being recessed and having one end of said cable secured therein and being provided with interior screw-threads, and the other of said parts B', being recessed and having a screw-threaded nipple to engage the threads of the opposite part, and a collar fixed on the opposite end of said cable and revolubly seated in the recess in part B' whereby to permit said part to be screwed into engagement with part B, substantially as described.

JOHN HATFIELD.

Witnesses:
THEODORE COLEMAN,
DENIS M. DRISCOLL.